United States Patent Office 3,400,100
Patented Sept. 3, 1968

3,400,100
PROCESS FOR THE PREPARATION OF POLYPHENYLENE ETHERS
Hein M. van Dort, Ede, and Cornelis R. H. I. de Jonge, Dieren, Netherlands, assignors to N.V. Onderzoekings-instituut Research Arnhem, Netherlands, a corporation of the Netherlands
No Drawing. Filed Mar. 8, 1966, Ser. No. 532,583
Claims priority, application Netherlands, Feb. 21, 1966, 6503568
5 Claims. (Cl. 260—47)

ABSTRACT OF THE DISCLOSURE

A process for the formation of polyphenylene ethers by oxidative coupling of phenols having substituents in at least 2 positions ortho to the oxygen ether atom using lead dioxide as the oxidizing agent in the presence of a small quantity of a compound soluble in the reaction medium and possessing a free electron pair. The process is distinguishable by the presence of the compound containing the free electron pair which promotes formation of polymers of substantially increased molecular weight.

---

This invention relates to a process for the formation of polyphenylene ethers by oxidative coupling of phenols having substituents in at least the two ortho positions, and hydrogen in the para position using lead dioxide as the oxidizing agent in the presence of a small quantity of a compound soluble in the reaction medium containing a free electron pair.

The polyphenylene ethers are a body of thermoplastics having a unique combination of physical, chemical and electrical properties over a large temperature range which render them suitable for a wide variety of commercial applications. A method for their preparation is described in U.S. Patent Nos. 3,306,874 and 3,306,875 of Allan S. Hay. According to the process of Hay, monophenols are subjected to oxidative polymerization by reaction with oxygen in the presence of a primary, secondary or tertiary amine and a copper salt soluble in the amine and capable of existing in the cupric state.

There are various disadvantages connected with the Hay process. For example, the polymer formed by said process contains a small quantity of nitrogen which is given off by the catalyst and difficult to separate from the polymer. Thus, it has been heretofore impossible to prepare a polyphenylene ether containing less than 0.03% by weight nitrogen according to the Hay process.

A second disadvantage of the process defined in the above noted Hay patent applications is that water is formed during the reaction when the phenol polymerized has hydrogen in the para position. This water must be removed continuously to avoid deactivation of the catalyst system, as well as the formation of undesirable by-products. Thus, costly provision must be made to insure that the water of reaction is removed as formed from the reaction mixture.

By comparison, the use of lead dioxide in accordance with the process of the present invention offers the advantage of higher yields in shorter reaction times and the polymers formed by said process have more favorable properties because they are not contaminated by catalyst residues and other impurities.

A process for the formation of a low molecular weight polyphenylene ether from 2,6-dimethyl phenol using a silver oxide oxidizing agent is described by B. O. Lindgren in Acta Chemica Scandinavica, 14 (1960), pages 1203–1210. The polymers, according to the process, have a degree of polymerization ranging between 10–16, which corresponds to a molecular weight of from 1300–1900. These polymers are entirely unsuitable for use as plastics and for the polyphenylene ethers, a degree of polymerization of at least 100 is necessary to insure adequate polymer properties.

A third method for forming polyphenylene ethers is described in French Patent 1,259,934 of C. C. Price and G. D. Staffin, patented Mar. 20, 1961. According to this patent, polyarylene ethers are prepared by polycondensation of a salt of a phenol which carries an ionic substituent in the para position, and preferably a halogen, e.g., chlorine, bromine and iodine radicals or a nitrate or sulfite radical. The aromatic oxide monomer is polymerized in solvent media, aqueous media or mixture thereof or by suspension or emulsion techniques. The reaction requires a catalyst capable of removing an electron from an aromatic oxide ion such as a phenoxide ion to generate an aromaticoxy, i.e., phenoxy, radical. Examples of catalysts that may be used are iodine, ultraviolet light and oxygen, silver oxide, lead tetraacetate, lead dioxide, benzoyl peroxide, potassium ferricyamide, etc. The disadvantage to this procedure is that the starting material must be a phenol that carried a substituent in the para position. Thus, the monomer useful in the polymerization is uneconomical and the polymers resulting from the reaction have the disadvantage of possessing a terminal halogen group. This results in a polymer which is sensitive to degradation due to the reactivity of the halogen groups. In addition, the halogen content of the polymer is higher than would be theoretically expected indicating formation of structural defects in the polymer.

It has now been found that the disadvantages of the prior art processes noted above can be substantially avoided by the process of the present invention wherein monophenols having substituents in at least the two ortho positions and hydrogen in the para positions are oxidatively coupled utilizing lead dioxide as the oxidizing agent in an amount of at least 1 mol per mol of phenol to be oxidized in the presence of a compound soluble in the reaction medium and possessing a free electron pair. Moreover, in addition to overcoming the various disadvantages of the prior art, the process for producing polyphenylene ethers in accordance with the present invention results in high yields of polymer of high molecular weight and in a properly controlled reaction system, yields in excess of 90% of the theoretical yield are consistently obtained. Furthermore, the polymer is more resistant to decomposition due to the absence of reactive groups such as halogen groups on the polymer chain.

Accordingly, one object of the present invention is to provide a process for the formation of polyphenylene ethers of high molecular weight which comprises reacting a monophenol having substitution in at least the two ortho positions and hydrogen in the para position using a lead dioxide oxidizing agent in the presence of a compound soluble in the reaction medium and having a free electron pair.

Other objects and advantages of this invention will in part be apparent and in part pointed out in the description which follows.

Briefly stated, the objects and advantages of this invention are achieved by oxidatively coupling a monophenol having substitution in at least the two ortho positions and hydrogen in the para position using lead dioxide as an oxidizing agent in an amount equal to at least 1 mol of lead dioxide per mol of phenol in the presence of from 0.1 to 2.0 mole percent of a compound soluble in the reaction medium and possessing a free electron pair. During the course of the reaction, lead dioxide is reduced to lead monoxide.

The monophenol that may be polymerized according to the process of the present invention may be represented by the following general formula

I

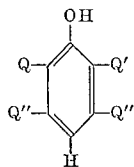

wherein Q and Q' are monovalent substituents selected from the group consisting of aliphatic hydrocarbon radicals free of a tertiary α-carbon atom, aliphatic halohydrocarbon radicals having at least two carbon atoms between the halogen atom and phenol nucleus and being free of a tertiary α-carbon atom, halogen, arylhydrocarbon radicals, haloarylhydrocarbon radicals, hydrocarbonoxy radicals being free of an aliphatic tertiary α-carbon atom and halohydrocarbonoxy radicals being free of a tertiary α-carbon atom and Q'' is the same as Q and Q' and in addition halogen. The preferred phenols are those wherein Q'' is hydrogen and the most preferred phenols for purposes of the present invention are 2,6-dimethylphenol and 2,6-diphenylphenol.

Typical examples of other phenols corresponding to Formula I above include, but are not limited to 2,6-dimethylphenol, 2,6 - diethylphenol, 2,6 - dipropylphenol, 2,6 - dibutylphenol, 2,6 - dilaurylphenol, 2,6 - diphenylphenol, 2,6 - dibenzylphenol, 2,6 - ditolylphenol, 2-methyl-6 - ethylphenol, 2 - methyl - 6 - phenylphenol, 2,3,6-trimethylphenol, 2,3,5,6 - tetramethylphenol, 2 - methyl - 6-bromophenol, 2,3,5 - trimethyl - 6 - chlorophenol, 2,6-dimethyl - 3 - chlorophenol, 2,6 - dimethyl - 3 - chloro-5-bromophenol, 2,6 - di - (chloroethyl)phenol, 2,6 - di (chloropropyl)phenol, 2,6 - dimethoxyphenol, 2-methoxy-6 - ethoxyphenol, 2,6 - diethoxyphenol, 2 - ethyl - 6-stearoxyphenol, 2 - hydroxy - 6 - isobutylphenol(isobutyl-pyrochatecol), 2-6-di-(chlorophenoxy)phenol, etc.

The polymers resulting from the oxidative coupling of the phenols corresponding to Formula I above may be represented by the following general formula

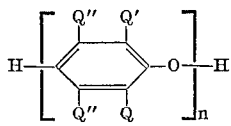

wherein the oxygen atom of one repeating unit is connected to the phenylene nucleus of the next repeating unit; $n$ is a whole integer of at least 100, and Q, Q' and Q'' are as defined above.

The process for forming the polyphenylene ethers may be carried out in solution and any solvent for the phenols which is nonreactive with the reagents used under reaction conditions are suitable. The preferred solvents are those in which both the phenol and the polymer formed are soluble. This permits ready removal of the excess lead dioxide and lead monoxide formed during the reaction from the reaction mixture by filtration or centrifugation.

Examples of typical solvents that may be used include, but are not limited to benzene, toluene, xylene, orthodichlorobenzene, tetrachloromethane, trichloromethane (chloroform), dichloromethane, 1,2-dichloroethane, etc.

The amount of lead dioxide necessary to carry out the reaction may vary between rather broad limits. As a minimum, at least 1 mol of lead dioxide per mol of phenol to be oxidized is necessary. To obtain high molecular weight polymers, it is desirable to use at least 1.5 moles of lead dioxide per mol of phenol to be oxidized. When the amount of lead dioxide exceeds 2.0 moles per mol of phenol, no further advantages are found and consequently, in a preferred embodiment of this invention, the quantity of lead dioxide used varies between 1.5 and 2.0 moles of lead dioxide per mol of phenol to be oxidized.

It has been found that the process of forming the polyphenylene ethers is favorably influenced and higher molecular weight polymers are obtained for a given quantity of lead dioxide if the reaction is carried out in the presence of a small amount of a compound which is soluble in the reaction medium and which possesses a free electron pair. Both aliphatic and aromatic amines are well suited for this purpose. Typical examples of such amines include, but are not limited to aniline, triethylamine, dimethyllaurylamine, tetramethylethylenediamine, tetramethylguanidine, etc. The cyclic amines are also suitable. Typical cyclic amines include pyridine, collidine, methylpyrrolidine, etc.

If polymers entirely free of nitrogen are to be obtained, a dialkylsulfoxide may be used in place of the amine as the compound containing the free electron pair. The preferred dialkylsulfoxide is dimethylsulfoxide.

Only a small quantity of the compound containing the free electron pair is needed to effectively increase molecular weight of the polymers. Good results are obtained with as little as 0.1 mol percent calculated on the phenol to be oxidized. In general, quantities ranging between 0.1 to 2.0 mol percent are preferred.

As noted above, during the polymerization reaction, the lead dioxide is reduced to lead monoxide. This may be removed from the reaction mixture or oxidized in situ to the lead dioxide form. Any manner known to those skilled in the art may be employed to oxidize the lead monoxide to lead dioxide. For example, an electrolytic process may be employed or the lead monoxide may be contacted with a hypochlorite solution.

The polymerization reaction may be carried out at a temperature varying between rather broad limits. However, high molecular weight polymers of better quality are more readily obtainable at lower reaction temperatures. With many phenols, a reasonably rapid reaction speed is obtained at ambient or room temperature and therefore a temperature ranging between 15 and 30° C. constitutes a preferred temperature range and a temperature of approximately 20° C. constitutes the most preferred reaction temperature.

The polymerization reaction is exothermic, and therefore, to perform the polymerization reaction within the preferred range of temperatures, it is necessary to either cool the reaction mixture to prevent undesirable temperature rise or to control reaction temperature through the gradual addition of the lead dioxide to the reaction mixture.

Occasionally, color bodies form in the reaction mixture. They can be removed by the addition of a sulphite or hydrazine to the solution. These materials render the solution substantially colorless and prevent unfavorable coloration of the polymer.

The polymer is recovered from the reaction mixture by any of the methods known to those skilled in the art. In general, the first step is to separate the insoluble lead compounds from the polymer solution. The polymer may then be precipitated by adding a precipitant, such as methanol. Alternatively, the polymer may be collected by evaporation of the solvent. If evaporation of the solvent is attempted, the reaction solution should be cleansed of all undesirable impurities prior to evaporation. For example, if the polymerization is performed in the presence of an amine, the polymer solution may first be washed with acidified water. The acidified water may contain a compound which has a strong tendency to form water insoluble compounds with lead to insolubilize any dissolved lead compounds.

The expression "lead dioxide" as used throughout this application is meant to include mixtures of lead dioxide with other compounds. However, it should be understood that the quantity of lead dioxide should always be equal to at least the molar amount of phenol to be oxidized.

The polyphenylene ethers prepared by the process of the present invention may be used for all those fields that have heretofore been proposed for these compounds, For example, they may be used as extrusion and injection molding compounds and as starting materials for films and fibers.

The following examples are set forth for purposes of illustration only and are not to be considered as limiting in any way.

Examples 1–29

In the following examples, a given quantity of phenol is dissolved in a solvent. The solution is stirred and lead dioxide is added. The reaction is allowed to proceed for the prescribed time and the lead oxides are thereafter precipitated by adding methanol in an amount equal to twice the amount of polymer solution. The polymer precipitates and is removed by filtration. Thereafter, it is dried in vacuum at 80° C. The relative viscosity ($\eta_{rel.}$) of the polymer is determined on a solution of 1% by weight polymer in benzene at 20° C. The reactants, their quantities, reaction temperature and times and results are set forth in Table I. The abbreviations set forth in the table have the following meaning:

2,6-DMP-2,6-dimethylphenol
2,6-DEP-2,6-diethylphenol
2,6-DmoxyP-2,6-dimethoxyphenol
2,6-DPP-2,6-diphenylphenol
TEA-triethylamine
TMG-tetramethylguanidine
PTS-paratoluenesulphonic acid
DMS-dimethylsulfoxide amounts of an extraneous material such as an acid does not render the process inoperative, but does, to some extent, show an unfavorable influence.

Example 24 illustrates the process of the present invention performed in the presence of a drying agent.

In all examples, yields in excess of 80% of theoretical were obtained, unless otherwise indicated.

The polymers resulting from the above examples possessed colors ranging from white to very light colored, with the exception of the polymer obtained in Example 19.

Example 30

In this example, 15 grams of 2,6-diphenylphenol are dissolved in 30 ml. of benzene. To this solution, there is gradually added over a period of 1 hour, with vigorous stirring, a slurry of 72 grams of lead dioxide in 35 ml. of benzene. Throughout the reaction, the temperature is maintained at 20° C. Following the addition of the slurry, the reaction mixture is stirred for an additional 2.5 hours. The polymer thus formed is isolated in the manner set forth in the above examples. The resulting polymer had a relative viscosity of 1.90 as determined for a 1% by weight solution in chloroform at 30° C. The polymer yield was in excess of 90%.

Example 31

The procedure of Example 30 was repeated, but the reaction mixture was stirred for 4.5 hours instead of

TABLE I

| Examples | Monomers — Parts by weight | Monomers — Compound | Medium — Parts by weight | Medium — Solvent | PbO₂ Parts by weight | Further Additives — Parts by weight | Further Additives — Compound | Temp., °C. | Reaction time, min. | $\eta_{rel.}$ | Particulars |
|---|---|---|---|---|---|---|---|---|---|---|---|
| 1 | 7 | 2,6-DMP | 93 | Benzene | 27 | 0.11 | TEA | 30 | 60 | 2.08 | |
| 2 | 7 | 2,6-DMP | 93 | Toluene | 27 | 0.11 | TEA | 30 | 60 | 1.89 | |
| 3 | 7 | 2,6-DMP | 93 | Chloroform | 37 | 0.11 | TEA | 30 | 60 | 1.84 | |
| 4 | 7 | 2,6-DMP | 93 | o-Dichlorobenzene | 27 | 0.11 | TEA | 30 | 60 | 1.89 | |
| 5 | 7 | 2,6-DMP | 93 | Benzene | 27 | | | 30 | 160 | 1.38 | |
| 6 | 7 | 2,6-DMP | 93 | Toluene | 27 | | | 30 | 160 | 1.50 | |
| 7 | 10 | 2,6-DMP | 90 | do | 24.5 | 0.16 | TEA | 22–28 | 60 | 1.10 | 25% excess PbO₂. |
| 8 | 10 | 2,6-DMP | 90 | do | 29 | 0.16 | TEA | 22–28 | 120 | 2.20 | 50% excess PbO₂. |
| 9 | 10 | 2,6-DMP | 90 | do | 34 | 0.16 | TEA | 22–28 | 180 | 2.44 | 75% excess PbO₂. |
| 10 | 10 | 2,6-DMP | 90 | do | 34 | 0.16 | TEA | 22–28 | 120 | 2.44 | |
| 11 | 10 | 2,6-DMP | 90 | do | 29 | 0.16 | TEA | 20–35 | 10 | 2.40 | |
| 12 | 10 | 2,6-DMP | 90 | do | 29 | 0.16 | TEA | 2–35 | 150 | 2.41 | |
| 13 | 10 | 2,6-DMP | 90 | do | 39 | 0.0008 | TEA | 10–35 | 60 | 1.69 | 0.01 mol. percent amine. |
| 14 | 10 | 2,6-DMP | 90 | do | 39 | 0.008 | TEA | 10–25 | 60 | 1.85 | 0.01 mol. percent amine. |
| 15 | 10 | 2,6-DMP | 90 | do | 39 | 0.025 | TEA | 20–35 | 70 | 1.76 | 0.3 mol. percent amine. |
| 16 | 10 | 2,6-DMP | 90 | do | 39 | 0.04 | TEA | 20–35 | 60 | 1.80 | 0.5 mol. percent amine. |
| 17 | 10 | 2,6-DMP | 90 | do | 39 | 0.1 | Acetic | 22–34 | 120 | 1.34 | 2 mol. percent acetic. |
| 18 | 10 | 2,6-DMP | 90 | do | 39 | 0.28 | PTS | 21–30 | 120 | 1.40 | 2 mol. percent PTS. |
| 19 | 10 | 2,6-DMP | 90 | do | 39 | 0.16 | HClO₄ | 21–35 | 45 | 1.49 | Strongly colored polymer. |
| 20 | 3.75 | 2,6-DEP | 90 | do | 12 | 1 | TMG | 21 | 60 | 1.53 | |
| 21 | 3.75 | 2,6-DMoxy | 90 | Chloroform | 12 | 0.15 | TMG | 20 | 240 | 2.05 | Yield 53%. |
| 22 | 40 | 2,6-DPP | 400 | Benzene | 190 | | | 20 | (¹) | 3.13 | |
| 23 | 4.9 | 2,6-DMP | 200 | Toluene | 24 | | | 20 | 160 | 1.67 | |
| 24 | 4.9 | 2,6-DMP | 200 | do | 24 | 12 | MgSO₄ | 20 | 160 | 1.58 | |
| 25 | 4.9 | 2,6-DMP | 200 | do | 24 | 0.15 | Pyridine | 20 | 160 | 2.88 | |
| 26 | 4.9 | 2,6-DMP | 200 | do | 24 | 0.15 | DMS | 20 | 160 | 2.26 | |
| 27 | 50 | 2,5-DMP | 200 | do | 240 | 5 | TEA | 20 | 15 | 2.13 | |
| 28 | 4 | 2,6-DPP | 40 | Benzene | 10 | | | 20 | (²) | 1.89 | |
| 29 | 12 | 2,6-DPP | 100 | do | 48 | | | 20 | (³) | 1.62 | |

¹ 4 days. ² 4 hours. ³ 1¼ hours.

Comparison of Examples 1 to 4 with 5 and 6 shows that polymers having higher relative viscosity are obtained when the reaction is performed in the presence of a small amount of amine, under otherwise equal reaction conditions.

Examles 7–9 illustrate how relative viscosity can be controlled by reguation of the quantity of lead dioxide added to the reaction mixture. It can be seen that as the concentration of lead dioxide increases, the relative viscosity of the polymer increases.

Examples 14–16 further illustrate the advantages obtained when a small quantity of an amine is added to the reaction mixture.

Examples 17–19 illustrate that the presence of small 2.5 hours. The relative viscosity was found to be 2.10 and the yield again exceeded 90%.

Example 32

The procedure of Example 30 was repeated, but the reaction mixture was stirred for 20 hours instead of 2.5 hours. The relative viscosity was found to be 2.73 and the yield again exceeded 90%.

Example 33

The procedure of Example 30 was repeated, but the reaction mixture was stirred for 40 hours instead of 2.5 hours. The relative viscosity was found to be 2.94 and the yield again exceeded 90%.

It should, of course, be apparent to those skilled in the art that changes may be made in the particular embodiments of the invention described which are within the full intended scope of the invention as defined by the appended claims.

What we claim as new and desire to secure by Letters Patent of the United States is:

1. In a process for the formation of a polyphenylene ether having a degree of polymerization of at least 100 comprising the steps of oxidative coupling a monophenol having substitution in at least the two ortho positions and hydrogen in the para position using lead dioxide as an oxidizing agent in an amount equal to at least 1 mole of lead dioxide per mol of phenol oxidized, the improvement comprising performing the reaction in the presence of from 0.1 to 2.0 percent of a compound selected from the group consisting of an amine and a dialkylsulfoxide.

2. The process of claim 1 wherein the dialkylsulfoxide is dimethylsulfoxide.

3. The process of claim 1 wherein the amine is triethylamine.

4. The process of claim 1 where the monophenol is 2,6-dimethylphenol.

5. The process of claim 1 wherein the monophenol is 2,6-diphenylphenol.

References Cited

UNITED STATES PATENTS

| | | | |
|---|---|---|---|
| 3,260,701 | 7/1966 | McNelis | 260—47 |
| 3,306,875 | 2/1967 | Hay | 260—47 |

WILLIAM H. SHORT, *Primary Examiner.*

M. GOLDSTEIN, *Assistant Examiner.*